(12) United States Patent
Mauger

(10) Patent No.: US 6,778,494 B1
(45) Date of Patent: Aug. 17, 2004

(54) LABEL SWITCHED MEDIA GATEWAY AND NETWORK

(75) Inventor: Roy Mauger, Herts (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/518,477

(22) Filed: Mar. 2, 2000

(30) Foreign Application Priority Data

Mar. 10, 1999 (GB) .............................. 9905509

(51) Int. Cl.[7] .............................. G08C 15/00

(52) U.S. Cl. .................. 370/230; 370/392; 370/401

(58) Field of Search ................ 370/229, 230, 370/352, 389, 392, 401

(56) References Cited

U.S. PATENT DOCUMENTS

| | | | | |
|---|---|---|---|---|
| 6,205,488 B1 | * | 3/2001 | Casey et al. | 709/238 |
| 6,363,053 B1 | * | 3/2002 | Schuster et al. | 370/400 |
| 6,490,451 B1 | * | 12/2002 | Denman et al. | 370/401 |
| 6,493,349 B1 | * | 12/2002 | Casey | 370/409 |
| 6,507,577 B1 | * | 1/2003 | Mauger et al. | 370/356 |
| 6,522,627 B1 | * | 2/2003 | Mauger | 370/230 |
| 6,545,992 B2 | * | 4/2003 | Naqvi et al. | 370/335 |

OTHER PUBLICATIONS

Nick Duffield et al: "A Performance Oriented Service Interface for Virtual Private Networks", Internet Engineering Task Force; Internet Draft, ONline! Nov. 1998, pp. i–xxviii.

E Rosen et al: "BGP/MPLS VPNs", IETF Request for Comments, Mar. 1, 1999, pp. 1–21.

Fernando Cuervo et al: "SS7–Internet Interworking—Architectural Framework", Internet Draft, Online! Jul. 1998, pp. 1–12.

ITU–T Recommendation H.323: "Visual Telephone Systems and Equipment for Local Area Networks Which Provide a Non–Guarenteed Quality of Service", ITU–T Series H, Nov. 1996, pp. 10–30.

* cited by examiner

Primary Examiner—Chi Pham
Assistant Examiner—Keith M. George
(74) Attorney, Agent, or Firm—Barnes & Thornburg

(57) ABSTRACT

A network arrangement for delivering IP services to subscribers includes a core network, a plurality of label switched media gateways coupled to the network and each providing an interface for one or more subscriber terminals. Call servers associated with the network are used to establish connections between pairs of gateways, these connections being routed across the core network via tunnels established therein. The tunnels are exclusively reserved for traffic between the label switched media gateways so as to provide security of that traffic from third party access and to provide a guaranteed quality of service. Because traffic is accepted into a tunnel only if bandwidth is available in that tunnel, firm and meaningful quality of service guarantees can be given to users.

18 Claims, 9 Drawing Sheets

LABEL SWITCHED MEDIA GATEWAY AND NETWORK

This Invention relates to communications (IP) networks and in particular to the provision and delivery of services Including data and voice services to subscribers over such networks.

BACKGROUND OF THE INVENTION

Broadband networks are becoming widely used to deliver services such as video, data and voice services to customers. Typically, these services are transported In packets In a connectionless manner using e.g. the Internet protocol (IP). Routing of packets within such a network is determined from information contained In the packet headers. These services originate from service providers, and a typical subscriber will have accounts with a number of these service providers. A particular problem In such an arrangement is that of providing each subscriber with the quality of service which he requires or demands for each particular service. This can be extremely difficult as the priority bits that are placed In the packet headers and are used in one network to identify the quality of service that has been guaranteed can become meaningless when the traffic passes through several nodes. It will be appreciated that different services will have different quality of service requirements ranging from the high quality demands of real time services, such as voice, to the best effort requirements of certain data services. In order to deliver such services, the network must be able to identify each service requirement and to provide sufficient bandwidth to deliver that requirement. This Is not always possible with existing networks.

A further problem is that of maintaining security of a user's traffic from potential eavesdroppers in order to protect the content of the transmitted information. This can be a critical issue e.g. for financial institutions. Currently, this protection can only be effected by encryption, but this can be both complex and expensive to provide. Additionally, some forms of encryption may be subject to legal restrictions where traffic Is carried across national borders.

Reference is here directed to my co-pending applications Ser. No. 09/190,083: Ser. No. 09/190,082; and Ser. No. 09/190,081 which relate to methods and apparatus for label switching In connectionless e.g. IP networks.

SUMMARY OF THE INVENTION

An object of the Invention is to minimise or to overcome the above disadvantages.

A further object of the invention is to provide an improved arrangement and a method for delivery of network services to a subscriber.

According to a first aspect of the invention, there is provided a network arrangement for delivering IP packet services to subscribers, wherein said services are transported In tunnels established across the network whereby to provide security of that traffic from third part access and to provide a guaranteed quality of service to traffic accepted into a said tunnel.

According to another aspect of the invention, there is provided a method delivering IP packet services to network subscribers, the method comprising establishing tunnels in the network, transporting said services in the tunnels whereby to provide security of that traffic from third party access, and accepting traffic into a said tunnel only where capacity is available so as to provide a guaranteed quality of service to traffic accepted into that tunnel.

According to a further aspect of the invention, there is provided a label switched media gateway for controlling subscriber access to a connectionless core network in which user traffic is routed via tunnels established therein, the gateway providing an interface between a plurality of subscriber terminals and being arranged to route user traffic across the network via tunnels of guaranteed capacity reserved for that traffic.

According to another aspect of the invention, there is provided a network arrangement for delivering IP services to subscribers, the arrangement comprising a core network, a plurality of label switched media gateways coupled to the network and each providing an Interface for one or more subscriber terminals, a plurality of call servers associated with the network and arranged to establish connections between pairs of said gateways, and wherein said connections are routed across the core network via tunnels established therein, said tunnels being exclusively reserved for traffic between the label switched media gateways so as to provide security of that traffic from third party access and to provide a guaranteed quality of service.

According to a further aspect of the invention, there is provided a method of controlling subscriber access to a connectionless network so as to provided controlled delivery of services to that subscriber, the method comprising routing traffic to and from said subscribers via tunnels established across the network, and controlling admission to a said tunnel by determining the currently available capacity of that tunnel so as to provide quality of service guarantees to accepted traffic.

According to a further aspect of the invention, there is provided a network arrangement for delivering IP services to subscribers, the arrangement comprising a core network, a plurality of label switched media gateways coupled to the network via respective edge nodes and each providing an interface for one or more subscriber terminals, a plurality of tunnels arranged in the core network in a full mesh between said edge nodes, each said tunnel having a predetermined traffic handling capacity and each being exclusively reserved for carrying traffic between a respective pair of said edge nodes, a plurality of call servers associated with the network and arranged to establish connections between pairs of said gateways via the respective edge nodes and tunnel, and wherein said call servers am arranged to determine the traffic occupancy of each said tunnel so as to accept new traffic into that tunnel only N sufficient capacity is available In that tunnel so as to provide a guaranteed quality of service for accepted traffic.

According to another aspect of the invention, were is provided a method of controlling subscriber access via edge nodes to a connectionless network so as to provided controlled delivery of services to the subscribers, the method comprising establishing a plurality of tunnels arranged in the network in a full mesh between said edge nodes, each said tunnel having a predetermined traffic handling capacity and each being exclusively reserved for carrying traffic between a respective pair of said edge nodes, determining in response to each subscriber request for service the available capacity of a said tunnel in which the subscriber traffic is to be routed, and accepting that subscriber request for service only if sufficient capacity Is available in hat tunnel so as to provide quality of service guarantees to accepted traffic.

According to another aspect of the invention, there is provided a label switched media gateway for controlling subscriber access to a connectionless (IP) core network in which user traffic is rout via tunnels established therein, the gateway providing an interface between a plurality of subscriber terminals and the network, and being arranged to route user traffic across the network via tunnels of guaranteed capacity reserved for that traffic, the gateway comprising a plurality of proxies for translating IP addresses between the network and encapsulated Layer 3 addresses, the letter constituting an address space which is allocated dynamically for session services to said subscribers.

The label switched media gateway (LSMG) is placed at the customer access point of an IP network in order to enhance the services offered by the IP network operator to the subscriber. In particular, the gateway construction allows the IP network operator:

To offer the full range of PSTN/ISDN services as well as IP derived services.

To offer quality of service for the services supplied to customers with the same guarantees as currently offered on PSTN/ISDN or ATM networks.

To offer security from eavesdropping or malicious intrusion to customers using the network without needing to resort to the expense and complexity of encryption.

To allow the provision of extranet service between different users whilst maintaining security from eavesdropping and malicious intrusion from third parties without needing to resort to encryption.

In a preferred embodiment, traffic is routed across the network in dedicated tunnels which are reserved for the exclusive use of the label switched media gateways thus preserving security of the user traffic without the need for encryption. The call servers are aware of the current status of the network and the current occupancy of each tunnel bandwidth resources. Because traffic is accepted into a tunnel only if bandwidth is available in that tunnel, firm and meaningful quality of service guarantees can be given to users.

The tunnels may be provided on a permanent basis, or they may be established on demand.

In a preferred arrangement, routing of IP packets is performed by appending two labels to each IP packet, the first label Identifying the tunnel to be used, and the second identifying the destination gateway for that packet.

BRIEF DESCRIPTION OF THE DRAWINGS

Embodiments of the invention will now be described with reference to the accompanying drawings in which.

DESCRIPTION OF PREFERRED EMBODIMENT

Figure 1:
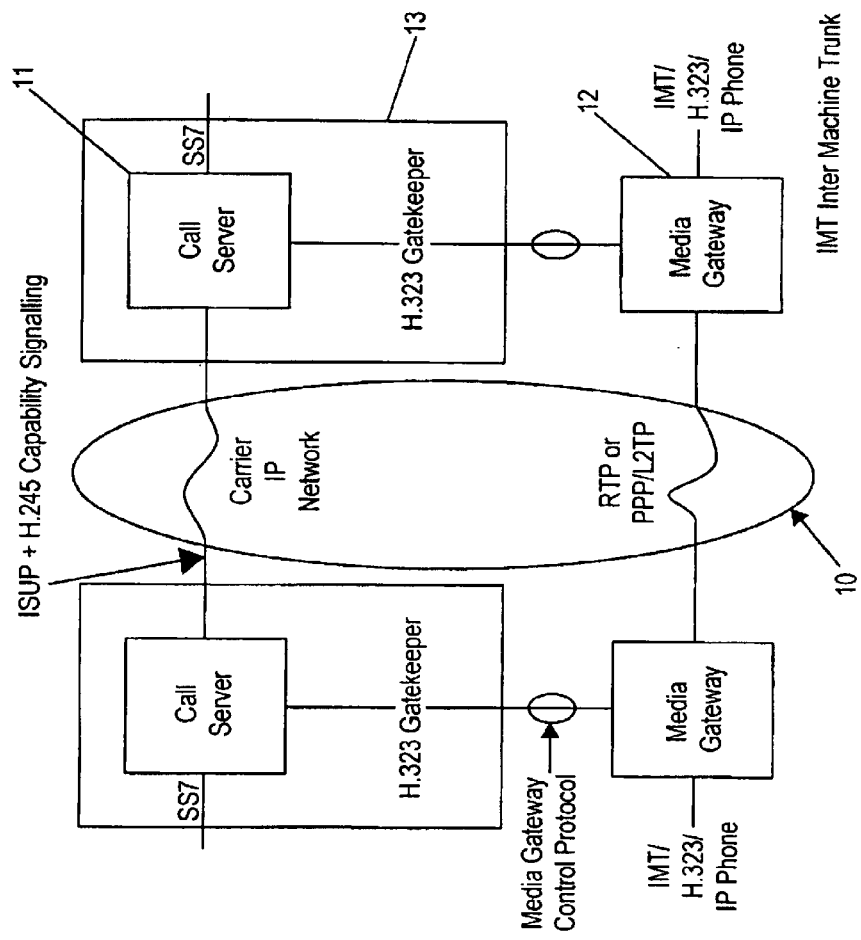
FIG. 1 shows a control environment for an IP network within which call servers are deployed on the IP network in order to offer switched services to customers.

Referring first to FIG. 1, which is introduced for explanatory and comparative purposes, this shows in schematic form an exemplary control environment for an IP network 10 delivering services from one or more service providers to subscribers. The arrangement comprises two main components, a call server 11 and a media gateway 12, the latter providing an interface between the IP network 10 and a client terminal (not shown). The call server may for example be embedded in a H.323 gatekeeper 13 as shown, or it may be an independent entity. The call server 11 is intended to provide the full set of PSTN and ISDN services as well as IP multimedia services. The media gateway is thus the access point between a customer's network and the IP Network 10 of the carrier offering the services to the customer.

In the network of FIG. 1, a media gateway control protocol (MGCP) is employed which allows the call server 11 to control the media gateway 12. In its current definition, the MGCP comprises two parts, a signalling part to manage simple line or trunk signalling systems and a connection control part which is able to make connections in IP, ATM, frame relay to other networks.

A signalling system is employed between the call servers 11, which is preferably based on existing signalling systems such as ISUP (ISDN User Part). In its simplest form this signalling system is required to communicate between the call servers:

The Information content of existing ISUP messages.

The IP addresses of the two endpoints.

Bandwidth and coding schemes for voice and video services.

The above requirements can be achieved by embedding, for example, H.245 capability messages into ISUP messages as user-to-user information elements. This is assumed for the purpose of the following description, but it will of course be understood that the system will function with any signalling system, which achieves the same set of requirements.

The system is able to work with external terminals, which may comprise the following:

Simple lines and trunks controlled via MGCP signalling, which may be directly connected to a media gateway or remotely connected via an IP access network to a media gateway.

Trunks connected directly or indirectly to a media gateway and controlled via SS7 signalling directly signalled to the call server.

H.323 terminals connected to a media gateway over an IP access network.

A fully featured call server would allow interworking and service transparency between all of these terminal types.

Figure 2:
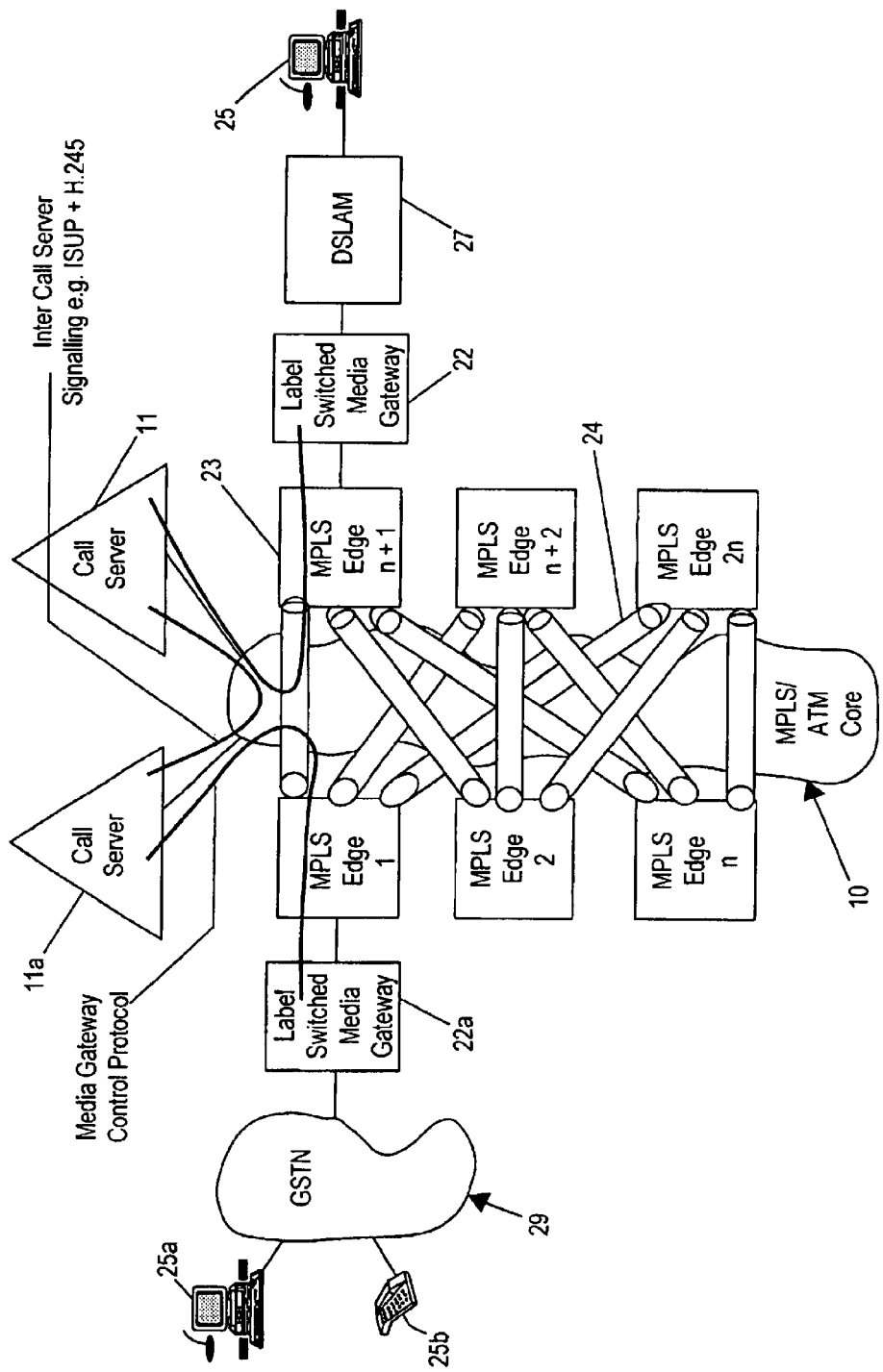
FIG. 2 illustrates a network arrangement according to a preferred embodiment of the invention.

FIG. 2 illustrates an exemplary carrier IP network according to a preferred embodiment of the invention and utilising and augmenting the general control architecture of FIG. 1. The media gateways shown in FIG. 2 comprise the label switched media gateways 22 to be described in further detail below. These gateways 22 are connected to MPLS (multi-protocol label switching) edge switches or nodes 23, which are in turn connected to the core IP network 10. It will be appreciated that each call server 11 can service a number of label switched media gateways 22. The core IP network 10 provides MPLS tunnels 24, with guaranteed traffic contracts, in a full mesh between the MPLS edge nodes 23 which support the label switched media gateways 22. MPLS tunnels are also referred to as explicit routed label switched paths (ERLSP). These MPLS tunnels are reserved for the exclusive use of the LSMGs 22. User terminals 25 may be coupled to the LSMGs 22 via a digital subscriber line access multiplexer (DSLAM) 27. The core IP network may be built from any suitable technology which permits the establishment of MPLS tunnels with traffic contracts and guarantees that these tunnels are secure from third party access or intrusion. ATM and native mode MPLS over optics are preferred examples of possible IP core network technologies, but the technique is not of course restricted to these particular technologies.

A further label switched media gateway 22a may provide access to a general switched telephone network (GSTN) 29, e.g. a PSTN, so as to deliver voice services to the subscriber terminals 25a, 25b via the network 10. It will be understood that a terminal may comprise e.g. a basic voice terminal (25b) or a PC terminal (25, 25a) providing a wide range of functionality.

It will be appreciated that each tunnel 24 through the MPLS/ATM core network of FIG. 2 will pass a number of intermediate MPLS nodes within the core. For the sake of clarity, these intermediate nodes have been omitted from FIG. 2.

When a pair of call servers 11, 11a operating on LSMGs 22, 22a at dent locations in the network have exchanged call signalling, IP address and bandwidth information and are ready to establish a connection, then they Issue MGCP (media gateway control protocol) connection control commands to the two LSMGs 22, 22a. These connection control commands Instruct IP streams to be opened from the sources and routed to the destinations. It Is possible In MPLS to explicitly mute the IP packets from a source for a destination over the particular tunnel which links the source and destination MPLS edge nodes. This Is achieved by appending two labels to the IP packet, the first label identifying the tunnel to be used, and the second identifying the destination LSMG on the destination MPLS edge node. This explicit routing can be achieved in a number of ways:

LSMGs may be aware of LSMG IP addresses and can hold information relating LSMG nodes to tunnel labels.

MGCP tunneling modes can be extended so as to control explicit routing In MPLS tunnels as well as L2TP (Layer 2 Tunneling Protocol) tunnels.

As the call servers 11, 11a are able to force traffic on to tunnels 24 with traffic contracts, then the servers are able to perform explicit bandwidth accounting as they receive bandwidth Information from the inter-call server signalling system for each of the traffic streams that they manage.

When a request for a new call session or a new traffic stream is received, it is thus possible to reject or refuse the request if the corresponding tunnel bandwidth is currently exhausted with existing traffic. The tunnel bandwidth can be established based on traditional traffic engineering principles and the system dimensioned according to a grade of service and a guaranteed quality of service. If a call is accepted, then it is guaranteed a high quality of service. If this quality of service can not be guaranteed, then the call is rejected. The probability of a call being rejected is a function of the grade of service which is a design parameter relating the traffic predictions to the deployed bandwidth in the tunnels.

Telephony systems occasionally experience mass calling events in which the rate of call attempts can reach ten times that used for the dimensioning of the system resources. It is necessary in such circumstances to maintain the level of successful call completions in this environment, as this serves to drain away the excess demand. Experience has shown that if the rate of successful call completions is not maintained then the network can remain in a state of collapse for many hours, as users continue to repeatedly attempt calls which fail. Within an LSMG/MPLS network the call server is able to reject calls without needing to deploy any network resources to those failed calls. This mode of operation allows the rate of successful call completions to be sustained and allows mass calling events to be controlled by leaking away the excess demand.

Figure 3:
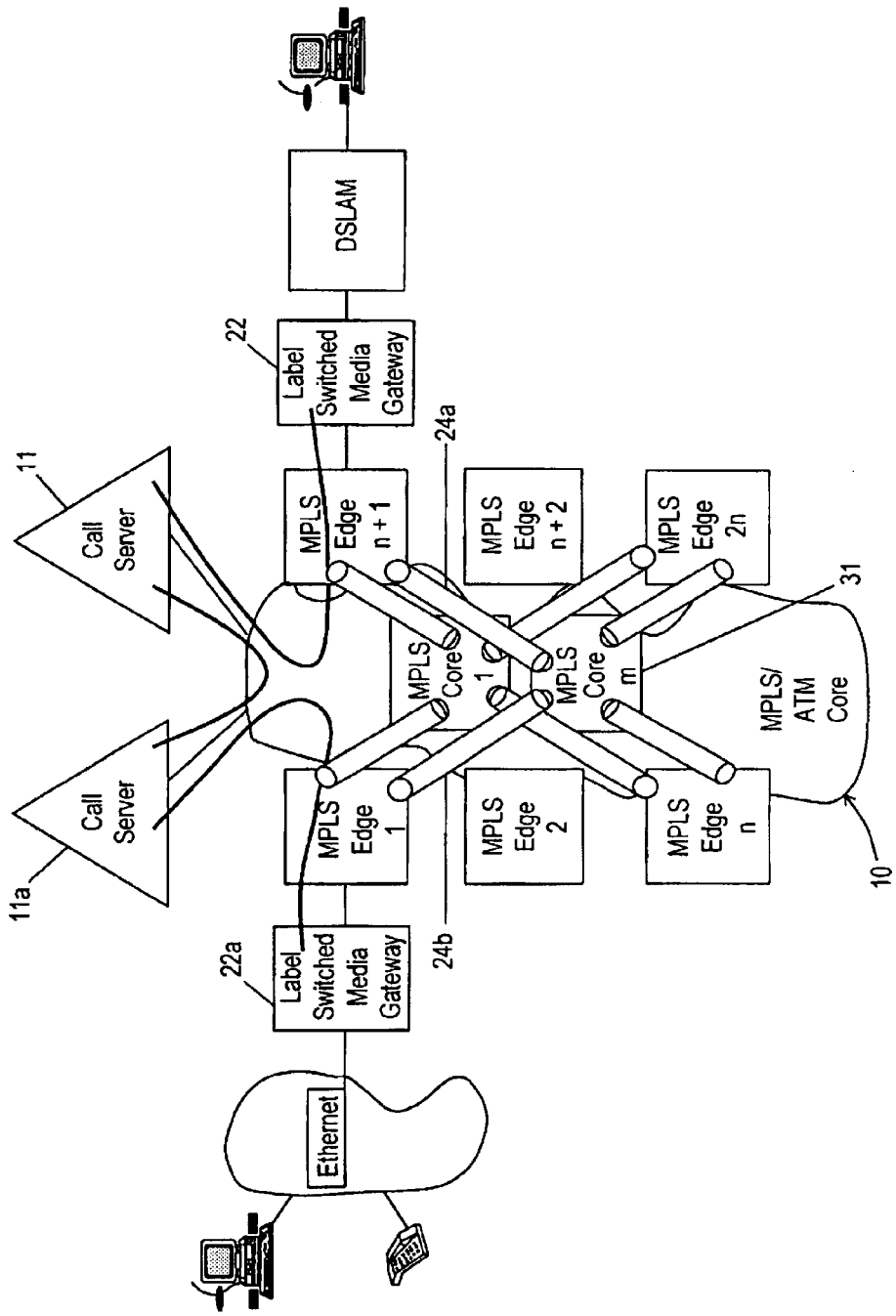
FIG. 3 illustrates a network arrangement according to another preferred embodiment of the invention which allows greater network scaling.

FIG. 3 illustrates an alternative embodiment incorporating a network architecture within which the explicit routing between edge nodes is forced over two tunnels in succession, e.g. 24a, 24b, with an intermediate MPLS node 31 which links the two tunnel endpoints. Within MPLS there are two possible ways of controlling explicit routing;

The originating LSMG can provide a stack of three labels identifying respectively the two tunnels and the destination LSMG. The first label is consumed on entry to the first tunnel, is translated at each intermediate MPLS node (not shown) along the tunnel 24a and is deleted at the penultimate intermediate node (not shown) in order to expose the second tunnel label at the intermediate node 29. This process is then repeated to expose the label for the destination LSMG at the destination MPLS node.

The originating LSMG can have a label for each destination LSMG. The first MPLS node is configured to route this traffic over the first tunnel so it adds a second label for that tunnel. This second label is removed prior to reaching the intermediate node providing the intersection between the two tunnels. This intermediate node is also configured to roue the traffic over the second tunnel and adds a further label. By a repeat process the packet with the destination LSMG label reaches the correct destination MPLS node and is then routed to the LSMG.

Figure 4:
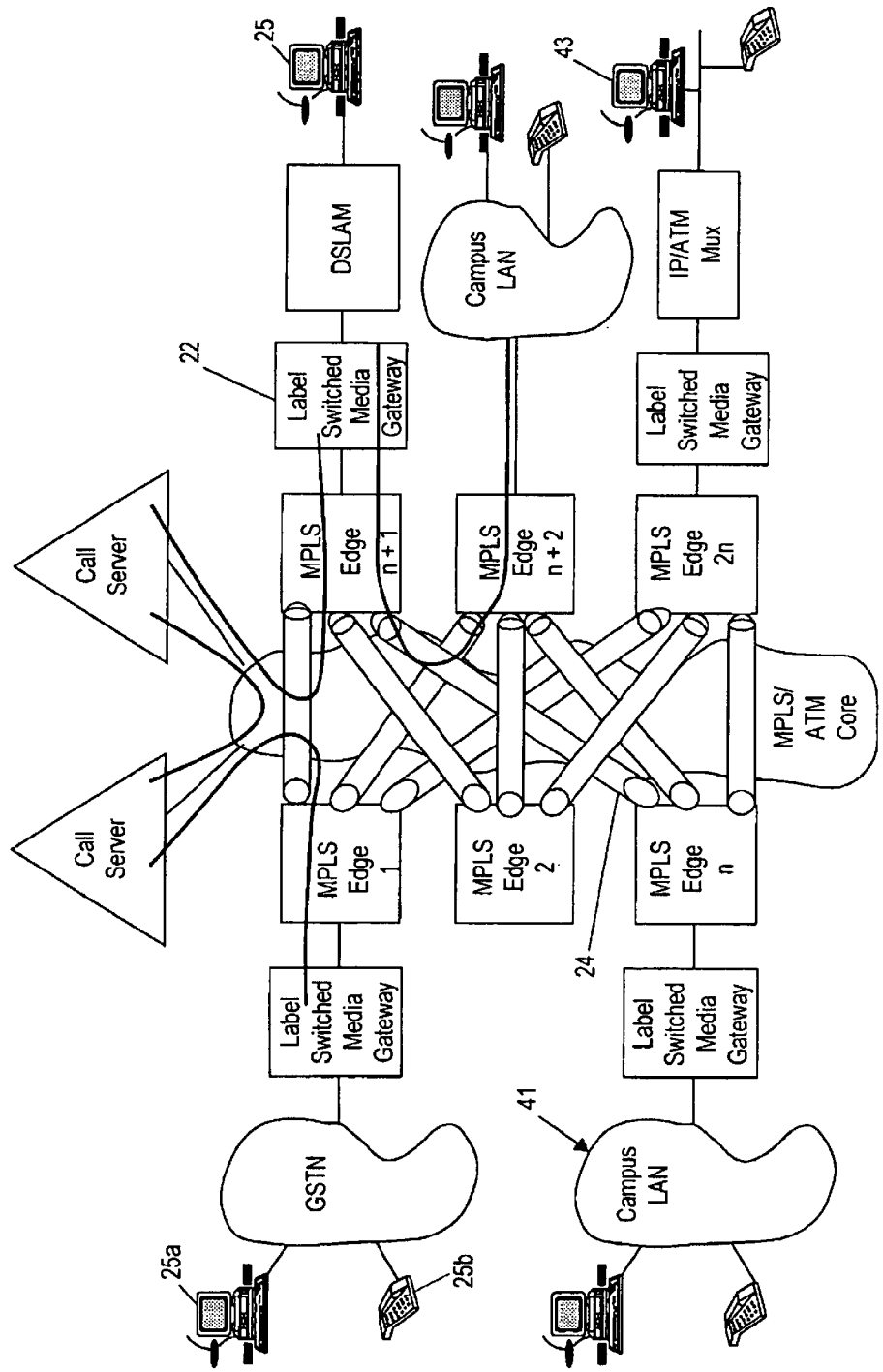
FIG. 4 illustrates the method by which IP addresses are managed within the networks of FIGS. 2 and 3.

FIG. 4 illustrates an exemplary scheme for IP address allocation within the LSMG networks of FIGS. 2 and 3. The LSMGs 22 have internal endpoints to the MGCP control protocol, which endpoints have respective IP addresses. Clients using PPP (point to point protocol) access links normally work with dynamic IP addresses. When connected to an LSMG, the LSMG addresses are assigned to the PPP terminals. When an LSMG 22 is connected to a campus network 41, typically through a L2TP tunnel 24, then the campus network will assign IP addresses to users of each PPP session multiplexed onto the L2TP tunnel.

When a service is provided from a campus network through a LSMG network to a PPP connected user then:

The user is known to the Internet via the IP address assigned by the campus network so that any packets sent to the user are routed to the firewall of the campus network.

The assigned address is translated at to LSMG providing campus access into a LSMG IP address.

The LSMG providing access to the PPP connected client provides the client with one of its IP addresses.

Switched IP connections are made using MGCP to connect the IP addresses of the two LSMG Internal addresses which are also end to end connections as a result of the access associations.

Small/Medium businesses 43 may act as host nodes or utilise LSMG IP addresses. Host nodes, e.g. associated with the campus network, use their own IP Addresses on access links. The LSMG provides IP address translation.

Figure 5:
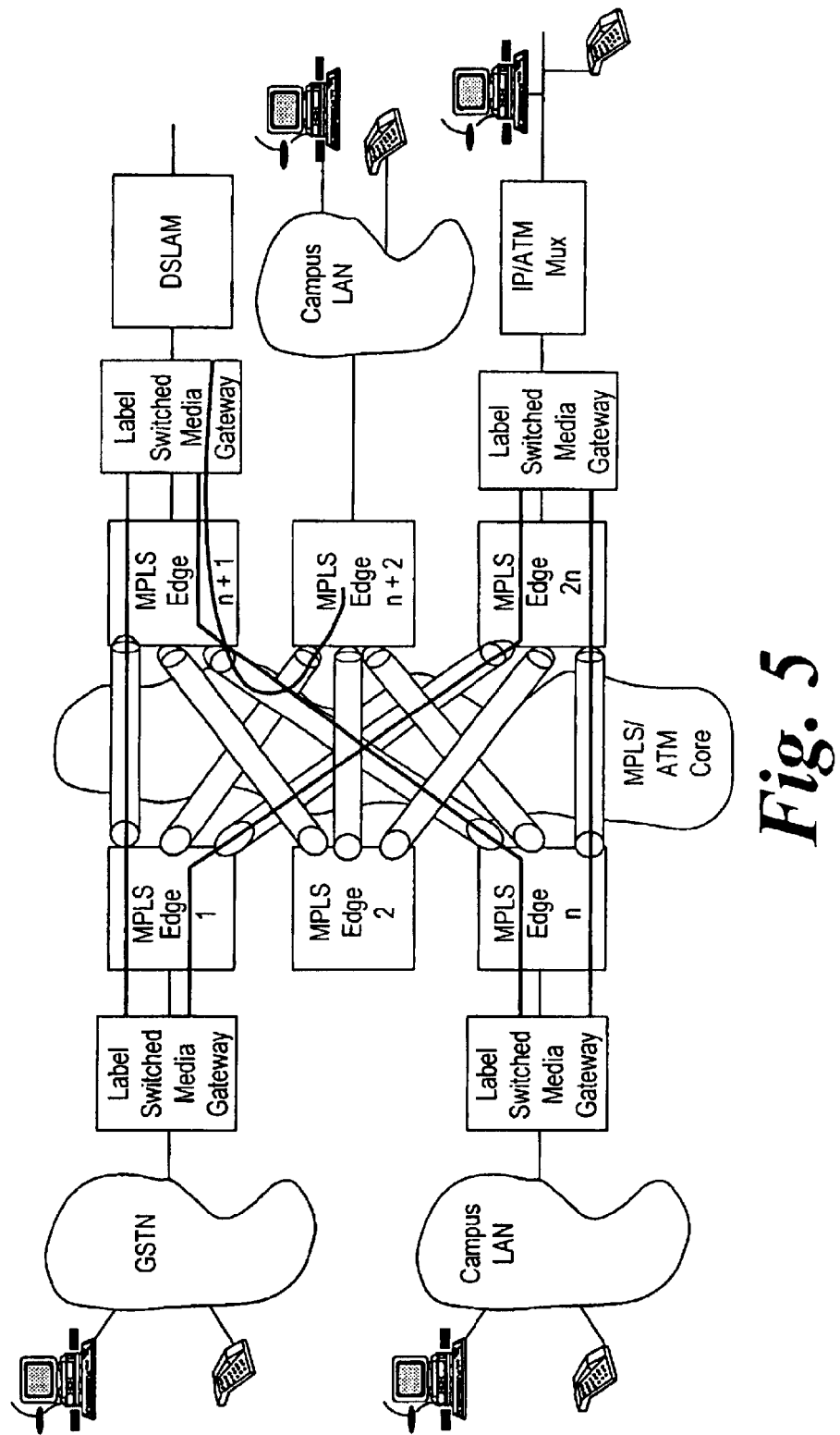
FIG. 5 illustrates the security mechanisms provided by the LSMG/MPLS networks of FIGS. 2 and 3.

FIG. 5 illustrates a number of security measures which are built into an LSMG. For virtual private Intranet (VPI) operation a tunnel is established between the VPI and the LSMG. Routing at Layer 3 uses VPI addresses to across the tunnel. It is assumed that the VPI implementation is based on Layer 2 segregation. The LSMG provides an extranet application proxy function. For RTP (Real Time Protocol) streams this is based on IP/UDP/RTP header compression within the session context. This implies RTP mux or L2TP between LSMGs. Call servers and LSMGs do not advertise themselves with their IP addresses, so that Layer 3 label switched routers have no means of acquiring routes to these entities. This restriction may be achieved in a number of ways:

LSMGs can be connected in a full mesh to all other LSMGs in MPLS tunnels, which are nested within the MPLS tunnels, which link the edge MPLS switches. This means that LSMGs only need to exchange information related to ERLSPs, not that related to general routing. As mentioned above, LSMG addresses are not advertised for Layer 3 routing. MGCP messages are interpreted as tunnel labels for explicit routing. Call servers are similarly secured.

The LSMGs may use labels, which are pre-assigned by a management system and delivered directly to all LSMGs. The MPLS edge nodes can then use policy control to ensure that label exchange is prevented from leaving its domain.

MPLS nodes, LSMGs and call servers all use IP see authentication on all control and signalling interfaces to ensure that unauthorised or malicious users are not able to use these nodes as a point of intrusion.

When interworking a LSMG with a virtual private Intranet (VPI), a MPLS tunnel can be configured to the nearest VPI access point, and VPI address space is allocated to the LSMG users. Routing in the Intranet is effected through the appropriate tunnel accessed from its VPI end. It is assumed that the VPI uses a form of Layer 2 segregation between VPI instances, such as virtual router subnets segregated by ATM VCs, such that no two VPIs share the same ATM VC.

The LSMG performs an application proxy firewall function in behalf of the end user networks. That is the LSMG checks that the user behaviour is valid within the context of the session as established. As an example, it would be theoretically possible for a user to negotiate the opening of a voice logical channel but to instead maliciously open a data channel. The use of IP/UDP/RTP header compression on an end to end PPP session would corrupt any such malicious data channel thus effectively preventing any such unauthorised use.

Figure 6:
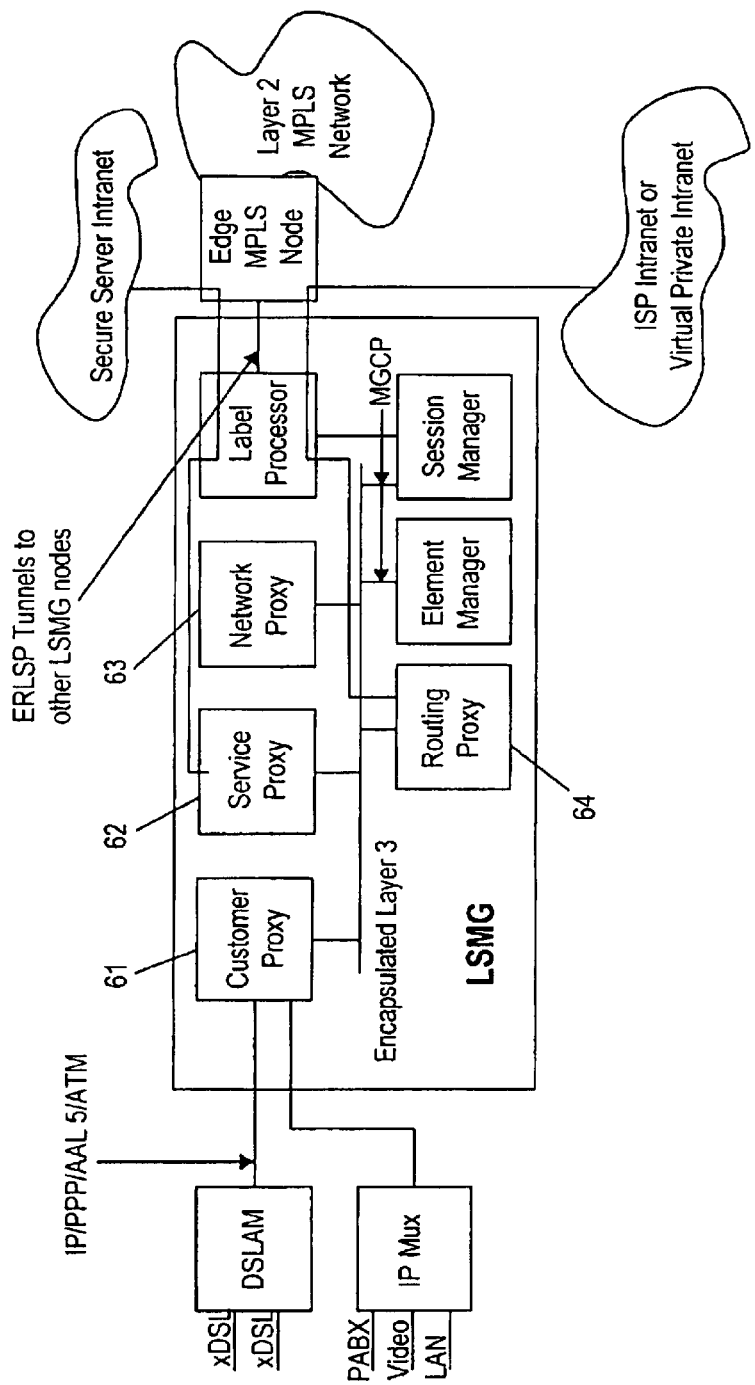
FIG. 6 shows the functional architecture of a label switched media gateway (LSMG node) employed in the networks of FIGS. 2 and 3.

FIG. 6 illustrates the logical architecture of the label switched media gateway (LSMG). Each individual customer is provided via the gateway with his own private Layer 3 routing environment. Routing is possible between user ports, network ports, call server ports and virtual private network ports. Each port is provided with a proxy server function, which acts as a relay point for user packets. Each Layer 3 environment is fully encapsulated and communication between users is only possible via external ports using the security mechanisms described above. The proxy functions translate between internal and external IP addresses. Each proxy provides a function related to the endpoint with which it is associated thus:

a customer proxy 61 controls the PPP session involved with the end user a service proxy 62 manages the association of an end user with a server. For instance a registration admission and status (RAS) of H.323 requesting a gatekeeper would be received and forwarded to a number of available gatekeepers. The service proxy is responsible in selecting from the respondents and providing a cut-through connection to the end user.

a network proxy 63 provides the endpoint with RTP multiplexing or L2TP tunneling functions.

a routing proxy 64 provides network address translations and other functions associated with access to a public or private or virtual private IP network.

Figure 7:
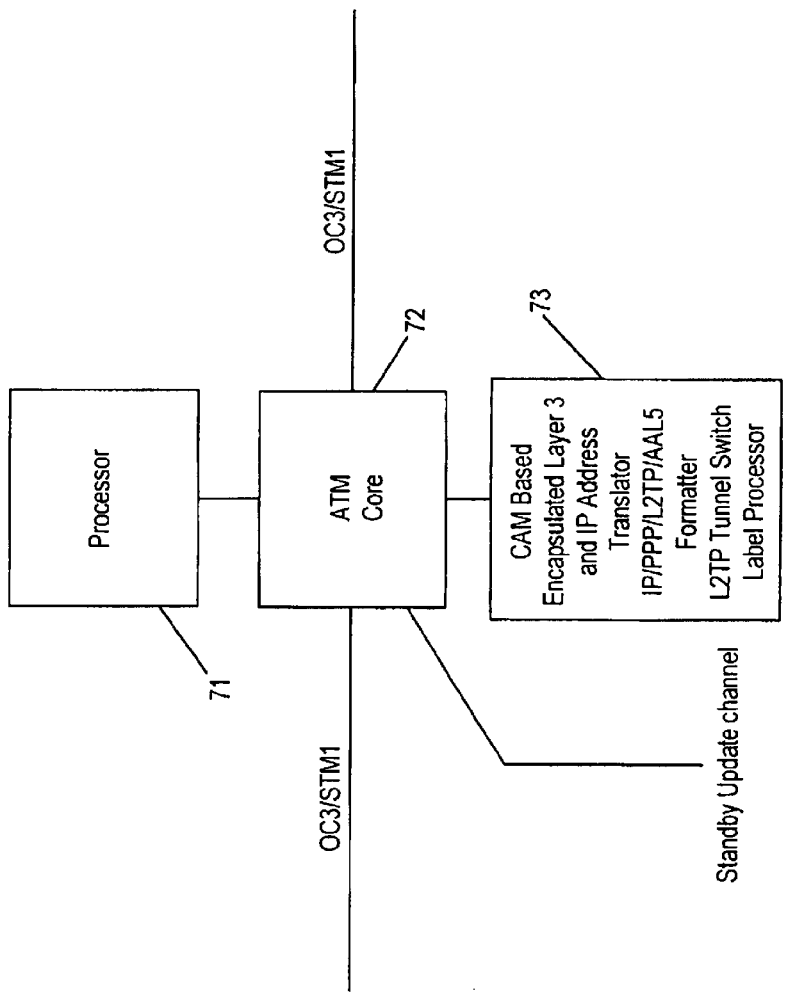
FIG. 7 shows the components of the traffic path or traffic module of the LSMG node of FIG. 6

An LSMG physical realisation comprises two parts, a traffic module FIG. 7) and a server (FIG. 8), the latter providing services for a group of traffic modules. It will be appreciated that a shared server may be co-located with a group of LSMGs, or it may be distributed over the network.

The realisation of the proxy functions is divided into two parts. The encapsulated Layer 3 is realised by a system of IP cut-through functions which explicitly record source and destination IP address and port numbers. If a packet is received for an established cut-through, that packet is forwarded directly by the traffic module HW at wire speed. Packets without a cut-through are forwarded to the LSMG SW for analysis to identify the associated proxy function. This then culminates in a cut-through to allow forwarding of the session media components.

Proxies translate IP addresses between external network and encapsulated Layer 3. EL3 addresses are part of the LSMG address space which Is dynamically allocated for session services.

FIG. 7 shows an exemplary realisation of a traffic module of the LSMG of FIG. 6 assuming operation in an IP over ATM environment. The traffic path for established IP Connections and established PPP sessions is handled by the traffic module independently of the centralised LSMG server. The traffic module comprises three submodules, namely a processor 71 for embedded software, an ATM module 72 for external connective and an LSMG specific module 73 which provides hardware assistance to enable the traffic module to operate at wire speed. The traffic module operates on an IP cut-through basis. Where client server relationships have been established then these are cut through. This is achieved by storing source and destination IP addresses and port numbers in a content addressable memory (CAM). When an IP packet arrives, the content addressable memory is addressed with its source and destination IP addresses. If these addresses are present in the memory, then the traffic module is able to extract the corresponding IP address translation; IP/PPP/L2TP formatting and MPLS label information so that packet forwarding is fully contained within the hardware of the traffic module. The LSMG hardware is thus a highly featured IP packet processor able to process IP address translations, IP/PPP/L2TP over ATM formatting and MPLS labels, as well as providing a content addressable memory for recording IP cut-through address pairs.

Figure 8:
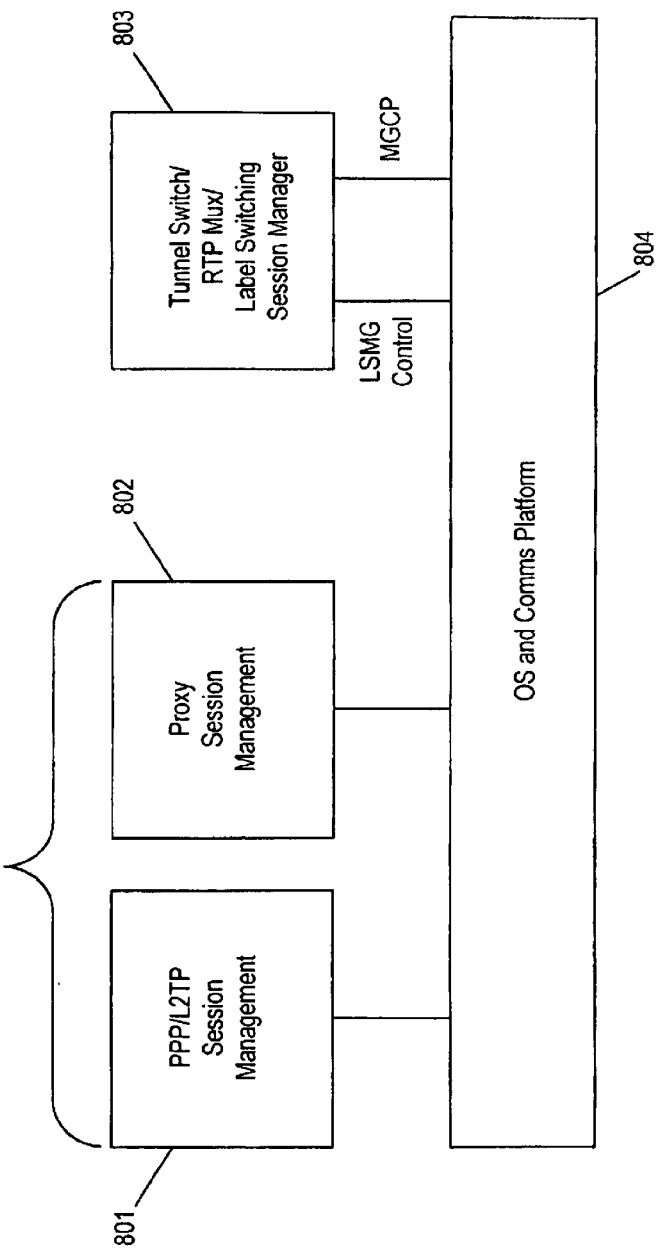
FIG. 8 illustrates the software components, deployed on servers, which are required to control the LSMG traffic path.

The traffic path for established IP Connections and established PPP Sessions is handled by the traffic module independently of a centralised INAS Server FIG. 8 shows the corresponding logical architecture of the LSMG server. This comprises:

Software for configuring PPP sessions and L2TP tunnels.

Software for progressing sessions to the point where a cut-through can be established in the traffic modules.

Software for controlling internal facilities of the traffic module such as:

Tunnel switching between L2TP tunnels to enable end to end PPP sessions controlled via RADIUS or Diameter servers.

RTP multiplexing which may be used for efficient communication between media gateways.

Label management to enforce the explicit routing mechanism.

Considering by way of example the operation of the system for H.323 client terminals:

When the PPP session is created between the user terminal and the LSMG then a connection is made with a LSMG IP address either by propagating it as a dynamic address to the terminal or by providing a translation between the supplied address and an arbitrary LSMG internal one.

When the H.323 client application powers up it sends a broadcast Registration Admission and Status (RAS) message searching for a gatekeeper. The LSMG traffic module has no cut-through for this packet so it forwards the packet to its server. The server recognises that this is a RAS message, so it repeats the message as a multicast to the gatekeeper servers. One or more gatekeepers respond to the broadcast message with an IP address port identity back to the LSMG server. The LSMG server selects one of the gatekeepers bids and sets up a cut-through in the LSMG traffic module.

The client terminal sends a RAS message to its gatekeeper requesting permission to make a call. Permission is returned including an IP address port for call signalling The client terminal then sends a call signalling message to its gatekeeper, but the IP address for call signalling may be different from that for RAS messages. If so, the call signalling message is trapped and sent to the LSMG server. The LSMG server recognises that this is H.323 call signalling so as to enable the cut-through and forward the message.

Assuming that the H.245 messages are embedded in the call signalling messages for fast call set-up, then the gatekeeper/call server will receive enough information to determine that through connection is required. Connection between the two terminals is then established by:

Establishing a cut-through in the LSMG traffic modules at either end.

Providing IP/PPP/L2TP formatting information.

Providing MPLS labels for the routing of packets end to end.

This is achieved by a combination of MGCP control commands (Create Connection, Modify Connection) and policy information supplied to the LSMG by its management system to enable it to correctly interpret the MGCP commands. Turning on of the voice or other media steams is independent of these operations and is achieved e.g. by H.245 open logical connection commands, which are sent by the gatekeeper to the client terminal. The LSMG operations guarantee that the voice packets will flow end to end with full quality of service (QoS) guarantees.

Figure 9:
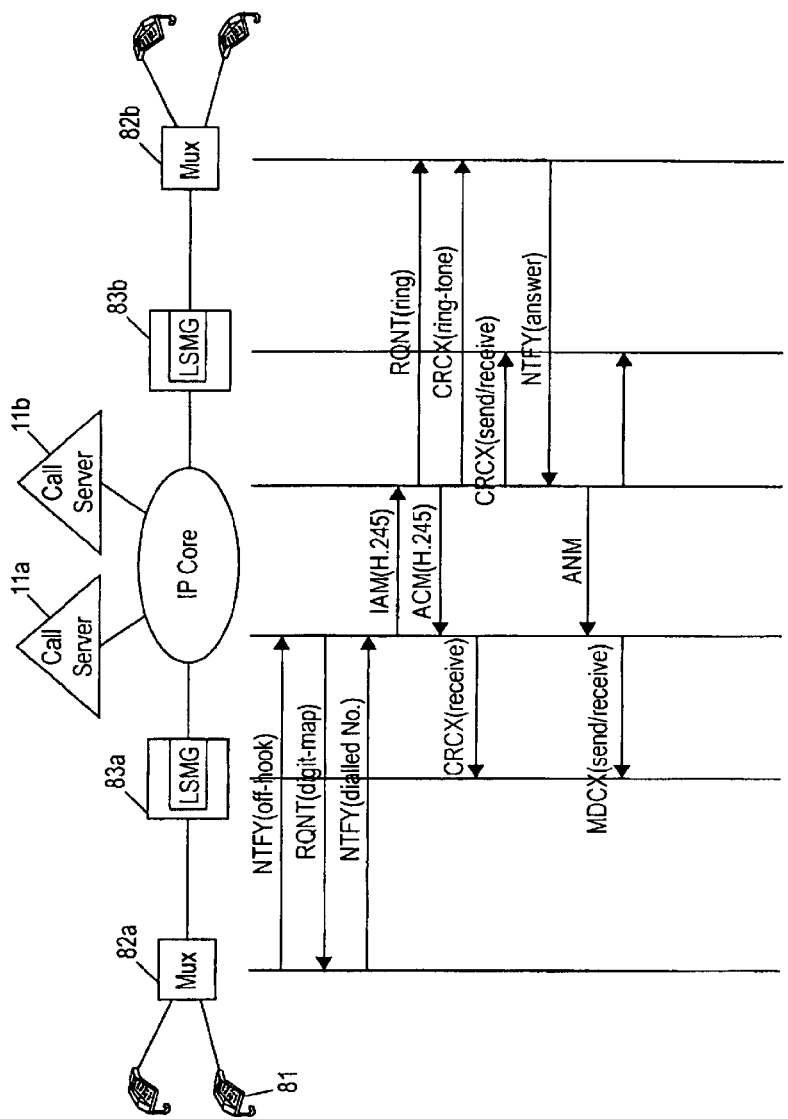
FIG. 9 shows by way of example a message sequence or flow chart for establishing a PSTN call using the LSMG/MPLS/call server architecture in the networks of FIGS. 2 and 3.

FIG. 9 illustrates the operation of the system for a simple PSTN call, e.g. to provide voice over IP services. Normal telephone sets 81 are connected via respective multiplexers 82a, 82b and an IP access system to an LSMG at either end of a carrier IP network. The diagram of FIG. 9 shows a message sequence to establish a successful call set-up between the two terminals (note that although MGCP messages are all acknowledged, these acknowledgements are not shown in FIG. 9 for clarity);

1. When the calling line goes off hook, the associated telephone mux system 82a sends a MGCP Notify (NTFY) with endpoint and offhook parameters. The telephony mux 82a autonomously provides dial tone to the calling party and removes that dial tone on receipt of the first digit received from the calling party.
2. The call server 11a responds with a MGCP Notification-Request message (RQNT) with a digit map to define the method for collecting digits.
3. The telephone mux 82a sends In the dialled number. NTFY (dialled No). At this point the telephony mux opens send and receive ports for voice traffic.
4. The call server 11a identifies the far end call server 11b from the dialled number and sends an Initial Address Message (IAM). This message contains e.g. a H.245 message defining G711 coding at 64 kb/s and the source LSMG IP address.
5. The far end call seer 11b sends a RQNT (NotificationRequest message) with endpoint and ring parameters.
6. The far end call server 11b returns an Address Complete Message to the near end call server 11a with G711 coding, 64 kb/s and the destination LSMG IP address.
7. The far end call server 11b sends a MGCP CreateConnection command (CRCX) to the far end telephone mux 82b opening Send and Receive path and requesting ring tone to be returned.
8. The far end call server 11b sends a CRCX command to its LSMG opening send and receive paths.
9. The near end call server 11a sends a CRCX message to its LSMG 22a opening a receive path only. The call originator can now hear ring tone.
10. At some point the called telephone 81b is answered and a NTFY message is sent to the far end call server 11b.
11. The far end call server 11b returns an Answer message (ANM) to the near end call server 11a.
12. The near end call server 11a sends a MGCP Modify-Connection command to its LSMG 22a to set into senor/receive mode. The call is flow in the conversation phase.

When the call has been completed, then a release message can be transmitted from either end. This release message is forwarded as an MGCP Notify message to the corresponding call server 11a (11b) which call server then sends an ISUP Release message to the call server 11b (11a) at the far end. The connections are released using MGCP Release connection commands and the call is terminated in the normal manner with the exception that MGCP messages are used to communicate with the LSMG rather than proprietary messages to the system's embedded peripherals.

It will be appreciated that, although particular reference has been made in the above description by way of example to use of the H.323 and H.245 protocols, the techniques described herein are in no way limited to use with these particular protocols but are of more general application.

It will be understood that the above description of a preferred embodiment is given by way of example only and that various modifications may be made by those skilled In the art without departing from the spirit and scope of the invention.

What is claimed is:

1. A network arrangement for delivering IP services to subscribers, the arrangement comprising a core network, a plurality of label switched media gateways coupled to the network, each providing an interface for one or more subscriber terminals, a plurality of call servers associated with the network and arranged to establish connections between pairs of said gateways, wherein said connections are routed across the core network via tunnels established therein, said tunnels being exclusively reserved for traffic between the label switched media gateways so as to provide security of that traffic from third party access and to provide a guaranteed quality of service and wherein each said tunnel comprises first and second tunnel portions coupled via a network node therebetween.

2. A network arrangement for delivering IP services to subscribers, the arrangement comprising a core network, a plurality of label switched media gateways coupled to the network via respective edge nodes and each providing an interface for one or more subscriber terminals, a plurality of tunnels arranged in the core network in a full mesh between said edge nodes, each said tunnel comprising first and second tunnel portions coupled via a network node therebetween and having a predetermined traffic handling capacity and being exclusively reserved for carrying traffic between a respective pair of said edge nodes, a plurality of call servers associated with the network and arranged to establish connections between pairs of said gateways via the respective edge nodes and tunnel portions, and wherein said call servers are arranged to determine the traffic occupancy of each said tunnel so as to accept new traffic into that tunnel only if sufficient capacity is available in that tunnel so as to provide a guaranteed quality of service for accepted traffic.

3. A network arrangement as claimed in claim 1 or claim 2, wherein said tunnels comprise multi-protocol label switched (MPLS) tunnels.

4. A network arrangement as claimed in claim 1 or claim 2, wherein said core network comprises an ATM network.

5. A network arrangement as claimed in claim 1 or claim 2, wherein at least one said gateway provides subscriber access to a voice network via the core network.

6. A network as claim ed in claim 1 or claim 2, wherein one or more said terminals are coupled to the respective gateways via digital subscriber line access multiplexers (DSLAM).

7. A network as claimed in claim 6, wherein a plurality of said terminals are coupled to a said gateway via a campus local area network.

8. A label switched media gateway for controlling subscriber access to a connectionless IP core network in which user traffic is routed via tunnels established therein, the gateway providing an interface between a plurality of subscriber terminals and the network, and being arranged to route user traffic in the form of IP packets across the network via tunnels of guaranteed capacity reserved for that traffic, the gateway being arranged to append two labels to each IP packet, one of the labels identifying the tunnel to be used and the other label identifying a destination label switched media gateway for that IP packet.

9. A label switched media gateway for controlling subscriber access to a connectionless (IP) core network in which user traffic is routed via tunnels established therein, the gateway providing an interface between a plurality of subscriber terminals and the network, and being arranged to route user traffic across the network via tunnels of guaranteed capacity reserved for that traffic, the gateway comprising a plurality of proxies for translating IP addresses between the network and encapsulated Layer 3 addresses, the latter constituting an address space which is allocated dynamically for session services to said subscribers.

10. A method of controlling subscriber access via edge nodes to a connectionless packet network so as to provide controlled delivery of IP packet services to subscribers, the method comprising establishing a plurality of tunnels arranged in the network in a full mesh between said edge nodes, each said tunnel having a predetermined traffic handling capacity and each being exclusively reserved for carrying traffic in the form of IP packets between a respective pair of said edge nodes, determining in response to each subscriber request for service the available capacity of a said tunnel in which the subscriber traffic is to be routed, and accepting that subscriber request for service only if sufficient capacity is available in that tunnel so as to provide quality of service guarantees to accepted traffic, wherein the method includes appending two labels to each IP packet, one of the labels identifying the tunnel to be used and the other label identifying a destination gateway for that IP packet.

11. A method as in claim 10, wherein, for virtual private Intranet (VPI) access, a tunnel is established between a VPI and a label switched media gateway, and wherein routing is performed at Layer 3 using VPI addresses to access the established tunnel.

12. A network arrangement for delivering IP services to subscribers, the arrangement comprising a core network, a plurality of label switched media gateways coupled to the network, and each providing an interface for one or more subscriber terminals, a plurality of call servers associated with the network and arranged to establish connections between pairs of said gateways, and wherein said connections are routed across the core network via tunnels established therein, said tunnels being exclusively reserved for traffic in the form of IP packets between the label switched media gateways so as to provide security of that traffic from third party access and to provide a guaranteed quality of service, wherein an originating label switched media gateway has means for appending two labels to each IP packet to be transmitted by that gateway, one of the labels identifying the tunnel to be used and the other label identifying a destination label switched media gateway for that IP packet.

13. A network arrangement for delivering IP services to subscribers, the arrangement comprising a core network, a plurality of label switched media gateways coupled to the network via respective edge nodes and each providing an interface for one or more subscriber terminals, a plurality of tunnels arranged in the core network in a full mesh between said edge nodes, each said tunnel having a predetermined traffic handling capacity and being exclusively reserved for carrying traffic in the form of IP packets between a respective pair of said edge nodes, a plurality of call servers associated with the network and arranged to establish connections between pairs of said gateways via the respective edge nodes and tunnel, and wherein said call servers are arranged to determine the traffic occupancy of each said tunnel so as to accept new traffic into that tunnel only if sufficient capacity is available in that tunnel so as to provide a guaranteed quality of service for accepted traffic, wherein an originating label switched media gateway has means for appending two labels to each IP packet to be transmitted by that gateway, one of the labels identifying the tunnel to be used and the other label identifying a destination label switched media gateway for that IP packet.

14. A method of controlling subscriber access via edge nodes to a connectionless packet network so as to provide controlled delivery of IP packet services to the subscribers, the method comprising establishing a plurality of tunnels arranged in the network in a full mesh between said edge nodes, each said tunnel comprising first and second tunnel portions coupled via a network node therebetween and having a predetermined traffic handling capacity and being exclusively reserved for carrying traffic between a respective pair of said edge nodes, determining in response to each subscriber request for service the available capacity of a said tunnel in which the subscriber traffic is to be routed, and accepting that subscriber request for service only if sufficient capacity is available in that tunnel so as to provide quality of service guarantees to accepted traffic.

15. An internet protocol (IP) network comprising:
a core IP network;
a plurality of label switched media gateways (LSMGs) coupled to said core IP network via respective multi-protocol label switch (MPLS) edge nodes, each LSMG providing an interface to the network for at least one subscriber terminal;
a plurality of call servers associated with the network for establishing MPLS tunnels in the core IP network between said MPLS edge nodes, said tunnels being reserved for subscriber traffic between said LSMGs and each having a predetermined traffic handling capacity, wherein said call servers are arranged to determine the traffic occupancy of a tunnel so as to accept new traffic into that tunnel only if sufficient capacity is available in that tunnel for the new traffic in order to provide a predetermined quality of service for accepted traffic, wherein each tunnel comprises first and second tunnel portions coupled via a core network node therebetween.

16. A method of providing subscribers access to an IP network via LSMGs coupled to said network by respective MPLS edge nodes comprises the steps of:
establishing by means of call servers associated with the IP network a plurality of MPLS tunnels in said network between said MPLS edge nodes, said tunnels being reserved for subscriber traffic between said LSMGs and each having a predetermined traffic capacity;
determining the traffic occupancy of a tunnel so as to accept new traffic into that tunnel only if sufficient capacity is available in that tunnel for the new traffic in order to provide a predetermined quality of service level to accepted traffic; and
appending two labels to each IP packet comprising subscriber traffic handled by said LSMGs, where one of the labels identifies a tunnel to be used to carry said IP packet and the other label identifies a destination LSMG for that IP packet.

17. An internet protocol (IP) network comprising:
a core IP network;
a plurality of label switched media gateways (LSMGs) coupled to said core IP network via respective multi-protocol label switch (MPLS) edge nodes, each LSMG providing an interface to the network for at least one subscriber terminal;
a plurality of call servers associated with the network for establishing MPLS tunnels in the core IP network between said MPLS edge nodes, said tunnels being reserved for subscriber traffic between said LSMGs and each having a predetermined traffic handling capacity, wherein said call servers are arranged to determine the traffic occupancy of a tunnel so as to accept new traffic into that tunnel only if sufficient capacity is available in that tunnel for the new traffic in order to provide a predetermined quality of service for accepted traffic;
wherein said LSMGs have means for appending two labels to each IP packet comprising subscriber traffic handled by said LSMGs, where one of the labels identifies a tunnel to be used to carry said IP packet and the other label identifies a destination LSMG for that IP packet.

18. An internet protocol (IP) network comprising:
a core IP network;
a plurality of label switched media gateways (LSMGs) coupled to said core IP network via respective multi-protocol label switch (MPLS) edge nodes, each LSMG providing an interface to the network for at least one subscriber terminal;
a plurality of call servers associated with the network for establishing MPLS tunnels in the core IP network between said MPLS edge nodes, said tunnels being reserved for subscriber traffic between said LSMGs and each having a predetermined traffic handling capacity, wherein said call servers are arranged to determine the traffic occupancy of a tunnel so as to accept new traffic into that tunnel only if sufficient capacity is available in that tunnel for the new traffic in order to provide a predetermined quality of service for accepted traffic;
wherein each LSMG comprises a plurality of proxies for translating IP addresses between the network and encapsulated Layer 3 addresses, the latter constituting an address space which is allocated dynamically for sessions services to said subscribers.

* * * * *